United States Patent [19]

Dutton, III et al.

[11] 4,061,517

[45] Dec. 6, 1977

[54] METHOD OF MAKING FLUOROCARBON RESIN COVERED GASKETS

[75] Inventors: Frederick O. Dutton, III, Moorestown; Joseph H. Stewart, Jr., Cherry Hill, both of N.J.

[73] Assignee: Chemelec Products, Inc., Cherry Hill, N.J.

[21] Appl. No.: 687,013

[22] Filed: May 17, 1976

Related U.S. Application Data

[63] Continuation-in-part of Ser. No. 608,065, Aug. 27, 1975, abandoned.

[51] Int. Cl.² ............................................. B29C 17/04
[52] U.S. Cl. ..................... 156/212; 156/229; 156/304
[58] Field of Search ................. 186/229, 212–215, 186/131–132, 193, 157; 227/227–233; 156/304

[56] References Cited

U.S. PATENT DOCUMENTS

| 1,871,953 | 8/1932 | Chilton | 156/193 X |
|---|---|---|---|
| 1,956,982 | 5/1934 | Denmire | 156/213 X |
| 2,037,666 | 4/1936 | Pennington | 156/214 |
| 2,459,721 | 1/1949 | Poltorak | 156/213 X |
| 2,580,546 | 1/1952 | Hobson | 277/232 |
| 2,581,933 | 1/1952 | Stevens | 156/421 |
| 2,859,061 | 11/1958 | Reid | 156/213 X |
| 3,137,935 | 6/1964 | Gachot | 277/229 X |
| 3,207,644 | 9/1965 | Hobson et al. | 277/232 X |

Primary Examiner—David A. Simmons
Attorney, Agent, or Firm—Howson and Howson

[57] ABSTRACT

The opposite ends of a flat strip of fluorocarbon resin tape of predetermined length and uniform width and thickness are butt-welded together to form a continuous circle of flat tape having uniform width and thickness throughout the length thereof. The opposite side and edge portions of the continuous circle of flat tape are passed between rolls which press and circumferentially stretch or elongate said portions to increase the peripheral circumference of the outer edge portions of said tape substantially to the outer diameter of an annular inner gasket assembly with which the cover is subsequently combined. The pressed and elongated circle of tape is doubled about the inner edge of an annular inner gasket assembly to dispose the circmferentially elongated opposite side and edge portions of said tape upon the opposite faces of the inner gasket. The overyling portions of the tape are ironed falt against the faces of the inner gasket by the application of heat and pressure.

7 Claims, 9 Drawing Figures

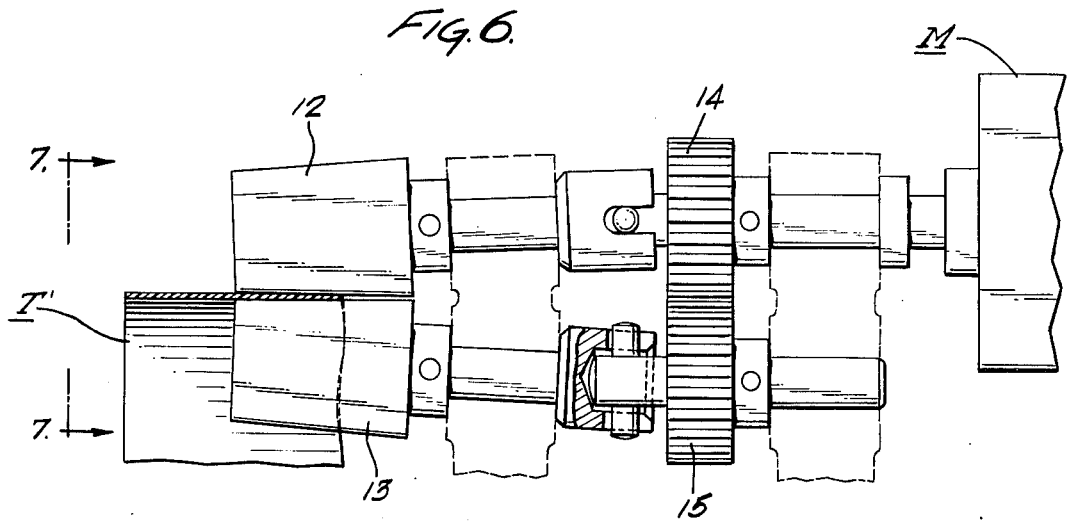
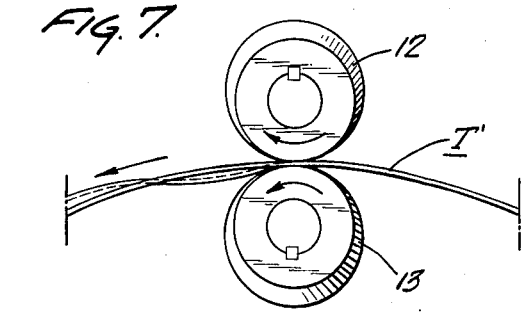
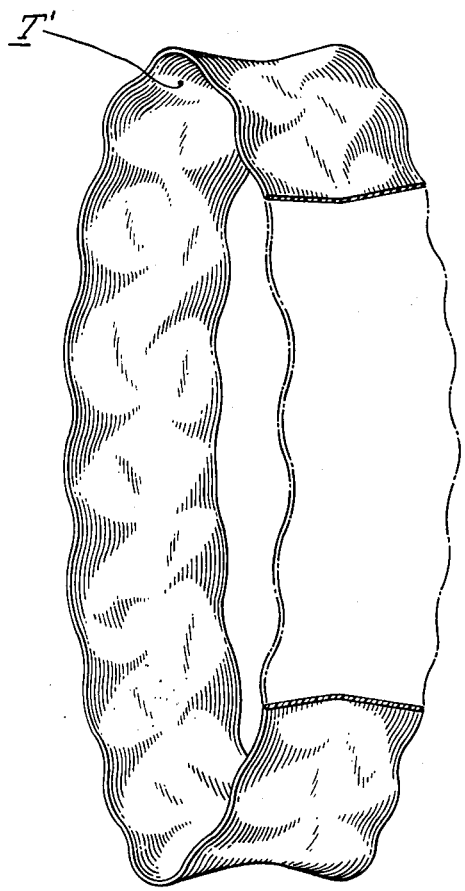
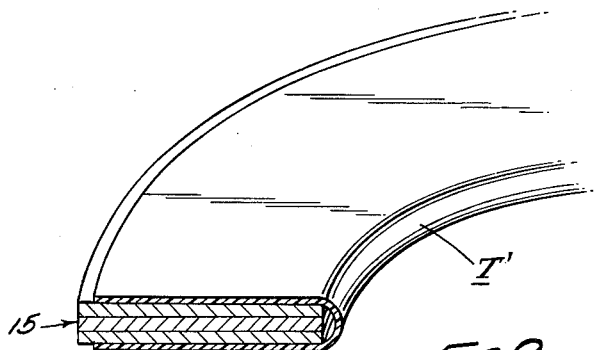

METHOD OF MAKING FLUOROCARBON RESIN COVERED GASKETS

This application is a continuation-in-part of application Ser. No. 608,065 filed Aug. 27, 1975, now abandoned.

This invention relates to annular or ring gaskets of the type having butt-welded outer covers of a fluorocarbon resin, and relates more particularly to a novel method of making the fluorocarbon resin outer covers.

Certain fluorocarbon resins, such as available in the market under the trade mark "Teflon," have chemical and physical properties that are particularly suited for use as outer covers for ring gaskets employed in many industrial applications. Such resins are highly stable over a wide range of temperatures and are chemically inert and resistant to acids and most other corrosive materials. As a result of these properties ring gaskets having outer covers of such fluorocarbon resins have experienced wide usage in industrial and processing equipment in which problems of corrosion and contamination are present such as, for example, in chemical and food processing equipment, glass lined piping and vessels, and other industrial and process equipment where corrosion, contamination and the like cannot be tolerated. Thus, in gaskets of the type with which the present invention is concerned, it is absolutely essential that the butt weld of the opposite end portions of the Teflon outer cover be homogeneous throughout and completely free of any pin holes that might permit passage of corrosive, contaminant or other undesirable material through the outer cover.

Prior to the present invention the methods employed for making fluorocarbon resin outer covers for such gaskets have not been efficient and there is the chance of producing a defective butt weld of the ends of the tape. For example, in one prior method the tape is folded double longitudinally along the centerline thereof, the opposite edge portions of the folded tape are pressed away from the center fold, and the folded and pressed tape is then unfolded before the opposite ends are disposed in abutting relation and welded together. This sequence of operations not only is inefficient from the production standpoint but it is substantially more difficult, after the tape has been folded, pressed and unfolded, to place the opposite ends of the creased tape in accurate registering abutting relation for welding, so that the possibility exists of producing a defective weld.

This possibility is substantially eliminated by the method of the present invention and a more efficient production of fluorocarbon resin gasket covers is also provided. In accordance with the present invention, a flat strip of fluorocarbon resin tape of predetermined width, length and thickness has its opposite ends butt-welded together in an homogeneous imperforate weldment to form a continuous circle of flat tape. The opposite side and edge portions of the continuous circle of flat tape are passed between a pair of driven rollers which press and circumferentially elongate the side and edge portions of the tape to provide an increased peripheral circumference in the side and edge portions of the tape so as to overlie and extend substantially to the outer diameter of the particular inner gasket with which the cover is subsequently assembled.

After opposite side and edge portions of the tape have been pressed and circumferentially elongated by passage through the rolls as descirbed, the continuous circle of tape is doubled about the inner circumference of an annular inner gasket assembly with the opposite said and edge portions of the continuous strip overlying the opposite faces of the selected inner gasket. The overlying portions of the resin cover may then be ironed flat against the opposite faces of the gasket by the application of heat and pressure.

By welding the opposite end portions of the resin tape in flat uncreased condition in accordance with the present invention, before the resin tape is folded and pressed, the ends of the tape can be disposed in accurate registering abutting relation for welding so that a homogeneous weldment, devoid of pin holes, is assured. The method of the present invention is also more efficient and reduces the production time for making the covers and completed gaskets.

Furthermore, by welding the ends of the resin tape while flat and before folding and pressing as described, it is possible to form a continuous circle of flat resin tape having a width equal to the sum of the widths of a plurality of narrower tapes and then subdivide the initial tape into said plurality of narrower tapes by slitting or otherwise severing the initial tape circumferentially parallel to the opposite edges thereof at predetermined spaced locations across the width of said initial tape. Each of the resulting plurality of narrower tapes is then pressed and circumferentially elongated as described. This procedure provides increased production at less cost than separately making each of a plurality of covers and is not adaptable to prior art processes in which the tape is cut, folded and pressed before its ends are butt-welded together.

These and other objectives of the invention and the various features and details thereof are hereinafter set forth and described with reference to the accompanying drawings, in which:

FIG. 6 is an elevational view, partially in section, showing an edge portion of the welded continuous tape passing between a pair of driven tapered press rolls operable to circumferentially stretch the tape;

FIG. 7 is a fragmentary end elevation as viewed from line 7—7, FIG. 6;

FIG. 8 is a perspective view, partially in section, showing the welded continuous tape after both edge portions thereof have been rolled to circumferentially stretch the edge portions of the tape, and FIG. 9 is a fragmentary perspective view, partially in section, showing the continuous stretched tape of FIG. 8 doubled about the inner circumference of an annular inner gasket assembly with the opposite side and edge portions of said tape respectively overlying the opposite faces of the annular inner gasket assembly.

Figure 1:
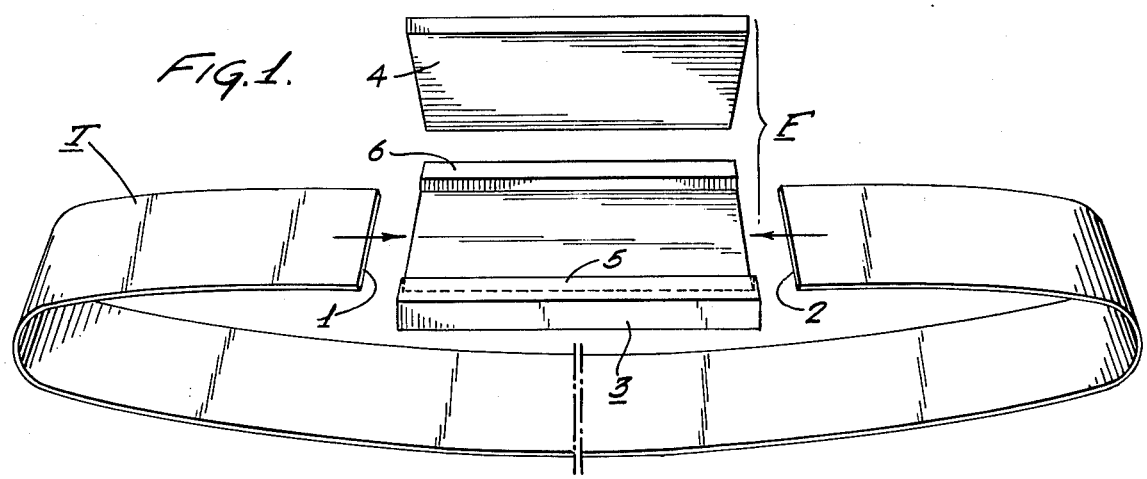
FIG. 1 is an exploded perspective view showing a tape of predetermined lenght, width and thickness with its opposite ends disposed in correlation to a fixture preparatory for insertion of the tape ends in abutting relation therein for welding.

With the foregoing in mind and referring to FIG. 1 of the accompanying drawings, in accordance with the method of the present invention a flat strip or tape T of fluorocarbon resin is provided having a predetermined length and a uniform width and thickness. In practice, the length of any given tape T is usually approximately equal to the circumference at the mean diameter of the inner annular gasket with which the resin cover is subsequently assembled and the width of the tape T is usually slightly greater than twice the radial dimension of said gasket so that when assembled therewith the resin cover will loosely embrace the inner edge of the gasket and overlie the opposite faces thereof substantially to the outer edge. The opposite ends 1 and 2 of the tape T are precisely cut transversely of the tape and perpendicular to the parallel side edges thereof so that said ends can be disposed with accurate confronting registration in abutting relation for welding together.

In order to weld the ends 1 and 2 of the tape T together, the opposite end portions of the tape are placed in the described abutting relation in a fixture F comprising a base member 3 and top plate 4, respectively. The base member 3 has a dimension longitudinally of the tape T at least as long as the length of the desired weldment, and parallel upstanding walls 5 and 6 are provided at the opposite side edges of said base member 3. The inner faces of the walls 5 and 6 are spaced apart a distance equal to the width of the tape T so that the opposite end portions thereof fit accurately and snugly between said walls 5 and 6 when placed upon the intervening upper surface of the base member 3. The top plate 4 is coextensive in length with the base member 3 and has a width the same as the tape and the spacing of the base side walls 5 and 6 so as to fit snugly therebetween in overlying relation upon the abutting end portions of the tape on the base 3, for example, as shown in FIGS. 2 and 3 of the drawings.

It is essential that the abutting end portions of the tape T be completely confined within the fixture F along both side edges and both opposite surfaces of said tape during the welding operation in order to prevent any dissipation or loss of the molten resin and thereby preserve and maintain the predetermined width and thickness of the tape uniformly throughout the weldment. Such confinement of the resin tape during welding of the end portions is effectively accomplished by the fixture base member 3 with its side walls 5 and 6 and the cooperating top plate 4.

Figure 2:
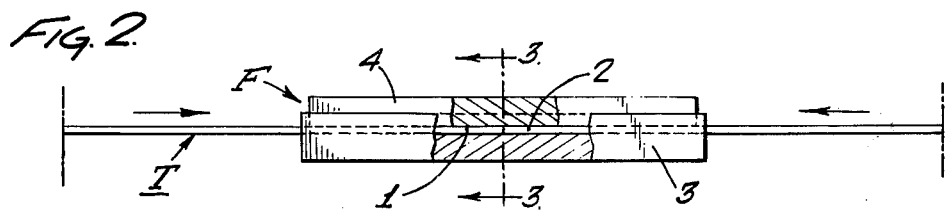
FIG. 2 is a side elevational view, partially in section, showing the opposite end portions of the tape disposed in abutting relation in the fixture.
Figure 3:
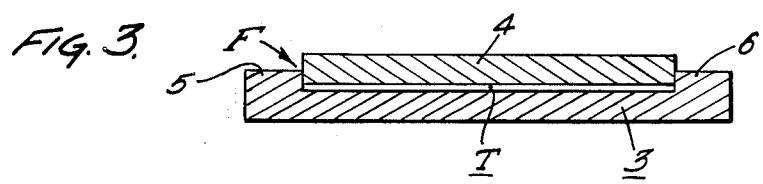
FIG. 3 is a sectional view on line 3—3, FIG. 2.
Figure 4:
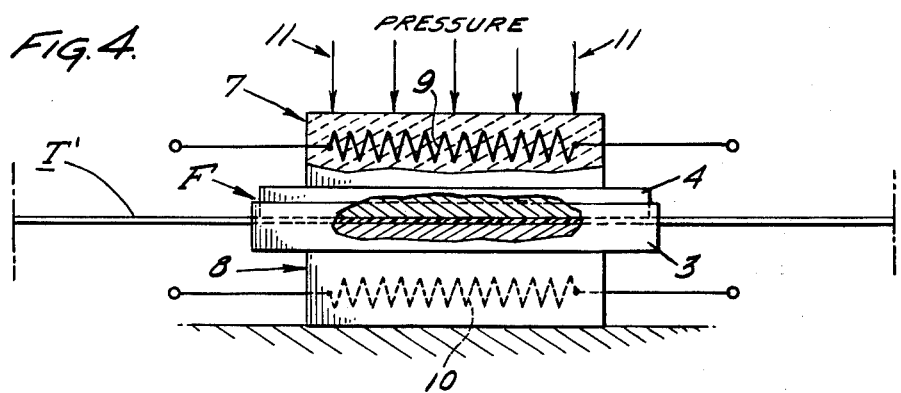
FIG. 4 is a view similar to FIG. 2, partially in section showing means for applying heat and pressure to the fixture to weld the abutting end portions of the tape therein.

When the opposite end portions of the tape T have been assembled in the fixture F as described and shown in FIGS. 2 and 3 it may be desirable to secure the assembly together by means of suitable clamps (not shown) engaged about the opposite ends of the base 3 and top plate 4 in order to facilitate handling of the assembly. As shown in FIG. 4 of the drawings, the assembly is placed between heater blocks such as 7 and 8, which may be heated, for example, by electrical resistance elements 9 and 10, respectively, to the temperature required to form a homogeneous butt-weld of the tape end portions within the fixture F. In the case of a fluorocarbon resin such as "Teflon" the temperature employed to weld the opposite end portions of the tape T is in the neighborhood of 800° F. for a period of about 6 minutes and a pressure of about 40 psi is applied to the assembly as indicated by the arrows 11.

Figure 5:
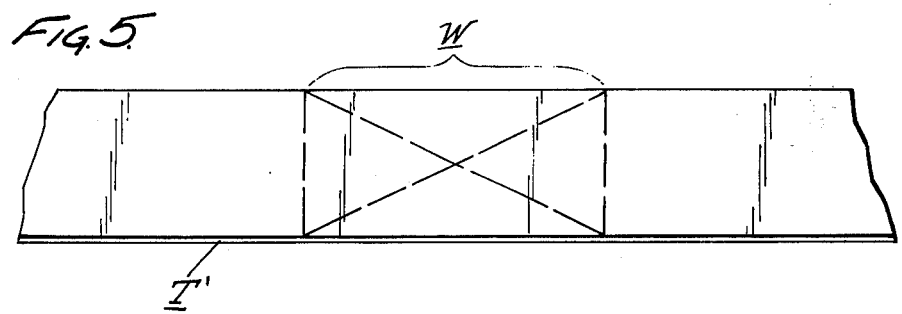
FIG. 5 is a fragmentary perspective view of a portion of the butt welded tape, showing the area of the weld.

After the welding operation has been completed the tape and fixture assembly is removed from the heating apparatus and the weldment allowed to cool to room temperature. Such cooling of the weldment may be expedited by quenching the assembly in water if desired. The welded tape is then removed from the fixture F and is in the form of a continuous circle of flat tape T' having the desired circumference and uniform width and thickness throughout its entire circumference including the area of the weldment indicated at W in FIG. 5 of the drawings. It is usually desirable to subject the completed weldment W to electrical testing in well-known manner to determine that the weldment is entirely free of pin holes or the like through which corrosive or other contaminant materials might pass.

In accordance with the present invention and as shown in FIG. 6 of the drawings, one side and edge portion of the continuous circle of flat tape T' is passed longitudinally through the nip of a pair of tapered rolls 12 and 13 that are rotatably driven in respectively opposite directions at a predetermined speed by a motor M through suitable gears 14 and 15. The clearance between the nip of the pair of rolls 12 and 13 is determined and fixed with relation to the uniform thickness of the continuous circular tape T' and is always less than said thickness so that the rolls 12 and 13 operate to press and circumferentially elongate said one side and edge portion of the tape to provide the peripheral circumference desired for the diameter of the particular inner gasket with which the resin tape cover is subsequently combined. After one side and edge poriton of the continuous tape T' has been pressed and elongated by passage through the rolls 12 and 13 as described, the opposite side and edge portion of the circular tape T' is passed between the nip of said rolls to similarly press and circumferentially elongate that side and edge portion of the tape. The resulting tape T' with its opposite side and edge portions pressed and circumferentially elongated as described will have the appearance shown in FIG. 8 of the drawings wherein the pressed and circumferentially stretched opposite side and edge portions have a sinuous or wavy configuration as illustrated.

In lieu of passing the opposite circumferential side and edge portions of the tape T' successively through the nip of a pair of rolls 12 and 13 as in FIG. 6 of the drawings, both opposite circumferential side and edge portions of the circular tape T' may be pressed and circumferentially elongated at the same time by passing said tape through the nip of a pair of rolls having the designed V-shape and taper operable to press and circumferentially stretch both opposite side and edge portions of the tape simultaneously during a single passage of the tape between such rolls.

The fluorocarbon resin tape T' after being pressed and elongated as described is doubled about the inner circumferential edge of an annular inner gasket assembly 15 so that the opposite side and edge portions of said tape overlie the opposite faces of the inner gasket assembly 15, for example, as shown in FIG. 9 of the drawings. The overlying portions of the resin tape T' may then be ironed and pressed flat against the opposite faces of the inner gasket by the application of heat at a temperature of about 250° F. applied at hand pressure.

A typical example of the present invention comprised providing a flat strip of fluorocarbon resin tape having a length of approximately 70 inches with a uniform width of about 3 inches plus the thickness of the gasket it is to cover and a uniform thickness of 0.015 inches. The opposite end portions of the tape were placed in the fixture F and while confined therein were welded together as previously described at a temperature of 800°

F. for 6 minutes under a pressure of 40 psi. After the welded continuous circle of flat fluorocarbon resin tape had been cooled to room temperature the opposite circumferential side and edge portions of said tape were passed between the nip of a pair of tapered rolls, such as 12 and 13, as previously described, to thereby press and circumferentially elongate the opposite side and edge portions of the tape. The pair of rolls were rotatably driven at a speed of about 60 rpm. Each of the rolls had a diameter of 1.625 inches at the small end and a diameter of 1.875 inches at the large end with an axial length of 2.937 inches so that the surface of each roll had a taper of approximately 2.5°. The clearance or space between the nip of the rolls at the small end thereof was 0.012 inches and at the large end was 0.007 inches. The pressed and circumferentially elongated circle of resin tape was then doubled about the inner circumferential edge of an annular inner gasket assembly having an inner diameter of 21.0 inches and an outer diameter of 24.0 inches. The overlying side and edge portions of the resin cover were manually ironed and pressed flat upon the opposite faces of the gasket assembly at a temperature of about 250° F. under hand pressure.

In lieu of making each individual fluorocarbon resin gasket cover separately as described, the method of the present invention can be employed to make a plurality of continuous circles of flat resin tape from an initial continuous circle of flat resin tape of greater width than the desired plurality of tapes. This is accomplished by butt-welding together as previously described, the opposite ends of a flat fluorocarbon resin tape of predetermined length and width to form an initial continuous circle of flat resin tape having a width at least equal to the sum of the widths of the desired number of narrower continuous circular flat resin tapes. This initial continuous circle of flat resin tape is then subdivided into the desired number of narrower continuous flat tapes by slitting or otherwise severing the initial tape circumferentially parallel to the opposite edges thereof at predetermined spaced locations across the width of the initial tape corresponding to the desired widths of the plurality of narrower tapes. Each of the plurality of narrower continuous circular flat tapes thus produced is then pressed and circumferentially elongated as described preparatory to being combined with an inner gasket assembly as set forth. This procedure is especially advantageous in filling orders for quantities of fluorocarbon resin gasket covers having the same circumference as it provides increased production at less cost than separately making each individual resin cover. Also, this advantage is not obtainable in prior art processes in which the resin tape is cut, folded, pressed and then unfolded before its ends are butt-welded together.

From the foregoing description it will be apparent that the present invention provides an efficient method for making fluorocarbon resin covered gaskets in which the opposite ends of the tape are butt-welded together in a homogeneous imperforate weldment when the tape is in a flat uncreased condition before it is folded and distorted whereby the ends of the tape can be disposed flat in accurate registering abutting relation for welding and a homogeneous weldment, devoid of pin holes, assured.

While certain particular embodiments of the present invention have been shown and described, it is not intended to limit the invention to such disclosures and changes and modifications may be made and incorporated as desired within the scope of the following claims.

We claim:

1. The method of making annular gaskets having outer covers of fluorocarbon resin which comprises:
   forming a flat strip of a fluorocarbon resin tape of predetermined length and uniform width and thickness throughout the length thereof,
   disposing the opposite ends of said flat strip in abutting relation and confining the abutting opposite end portions of the strip at the opposite sides and surfaces thereof according to the uniform width and thickness dimensions of the tape,
   subjecting the end portions of the strip while thus confined to a temperature and pressure operable to weld the confined abutting end portions of the tape and form a continuous circle of flat tape having uniform width and thickness throughout the length thereof,
   pressing and circumferentially elongating the opposite side and edge portions of the continuous circle of tape to increase the circumferential dimension of said tape in the opposite edge portions thereof substantially to the outer circumference of a selected annular inner gasket,
   and doubling the circumferentially elongated tape about the inner edge of said selected annular inner gasket to provide a cover therefor with the opposite side and edge portions of said tape disposed in overlying relation upon the opposite faces of the inner gasket.

2. The method claimed in claim 1 wherein the doubled tape opposite side and edge portions overlying the opposite faces of the gasket are ironed flat against said gasket faces by the application of heat and pressure.

3. The method claimed in claim 1 wherein the opposite side and edge portions of the continuous flat circular tape are pressed and elongated circumferentially by passing said side and edge portions between the nip of a pair of rotatably driven tapered rolls.

4. The method claimed in claim 3 wherein the opposite side and edge portions of the continuous flat circular tape are simultaneously pressed and elongated circumferentially by passing said side and edge portions simultaneously between the nip of pairs of rotatably driven tapered rolls.

5. The method of making annular gaskets having outer covers of fluorocarbon resin which comprises:
   forming a flat strip of a fluorocarbon resin tape of predetermined length and uniform width and thickness throughout the length thereof,
   disposing the opposite ends of said flat strip in abutting relation and confining the abutting opposite end portions of the strip at the opposite sides and surfaces thereof according to the uniform width and thickness dimensions of the tape,
   subjecting the end portions of the strip while thus confined to a temperature and pressure operable to weld the confined abutting end portions of the tape and form an initial continuous circle of flat tape having uniform width and thickness throughout the length thereof,
   cutting said initial continuous circle of flat tape circumferentially parallel to the opposite edges thereof at predetermined spaced locations across the width of the tape to subdivide said initial tape into a plurality of narrower continuous circles of flat tape having widths corresponding to said predetermined spaced locations, pressing and circumferentially elongating the opposite side and edge portions of each of said narrower continuous circles of flat tapes to increase the circumferential dimensions of said tapes in the opposite edge portions thereof substantially to the outer circumference of a selected annular inner gasket, and doubling each of the circumferentially elongated narrower tapes about the inner edge of the selected annular inner gasket to provide a cover therefor with the opposite side and edge portions of each of said tapes disposed in overlying relation upon the opposite faces of said selected inner gasket.

6. The method claimed in claim 5 wherein the opposite side and edge portions of each of the narrower tapes overlying the opposite faces of an inner gasket and ironed flat against said gasket faces by the application of heat and pressure.

7. The method claimed in claim 5 wherein the opposite side and edge portions of each narrower continuous circle of flat tape are pressed and elongated circumferentially by passing said side and edge portions between the nip of a pair of rotatably driven tapered rolls.

* * * * *